Figure 4:
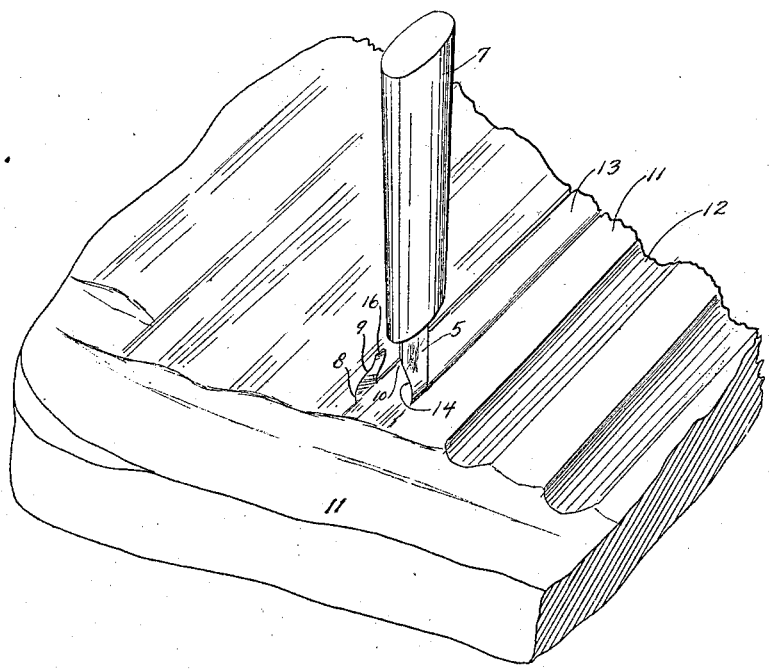

C. M. MAISEL.
RIB BONER.
APPLICATION FILED AUG. 5, 1909.

984,013.

Patented Feb. 14, 1911.

WITNESSES:
Walter H. Kelly.
Ethel A. Kelly.

INVENTOR
Conrad M. Maisel
BY J. Wm. Ellis
ATTORNEY.

THE NORRIS PETERS CO., WASHINGTON, D. C.

UNITED STATES PATENT OFFICE.

CONRAD M. MAISEL, OF BUFFALO, NEW YORK, ASSIGNOR OF ONE-HALF TO HENRY STRADTMAN, OF SLOAN, NEW YORK.

RIB-BONER.

984,013.  Specification of Letters Patent.  Patented Feb. 14, 1911.

Application filed August 5, 1909. Serial No. 511,421.

*To all whom it may concern:*

Be it known that I, CONRAD M. MAISEL, a citizen of the United States of America, residing in the city of Buffalo, county of Erie, and State of New York, have invented a certain new and useful Rib-Boner, of which the following is a full, clear, and exact description.

My invention relates generally to rib boners and more particularly to a rib boner for extracting ribs from bacon, salt pork, veal, lamb or mutton.

Figure 1:
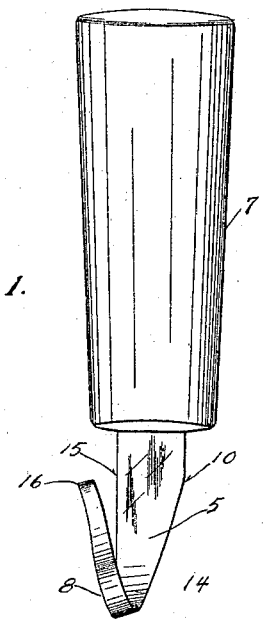
Figure 3:
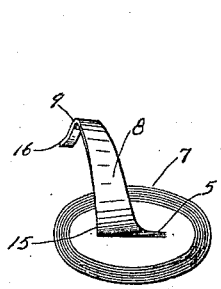
Figure 2:
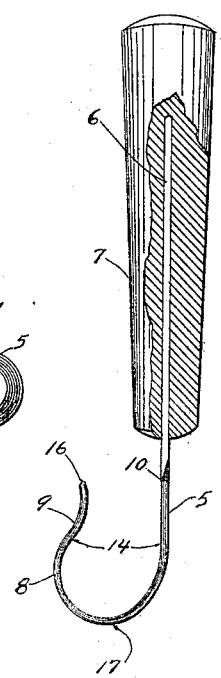

My object has been to provide a boner which would remove from the above mentioned meats all the rib bones and the like and do the work in a manner and at a speed which has not been heretofore possible. This object I have accomplished by the invention which is hereinafter described reference being had to the accompanying drawings forming part of this specification in which similar reference characters indicate corresponding parts throughout the several views and in which:

Figure 1 is a side view of my boner. Fig. 2 is a front view showing the handle partly broken away. Fig. 3 is an end view of my boner. Fig. 4 is a perspective view showing my boner in the act of removing a bone from a piece of meat.

The boner generally is represented by the numeral 5. Its upper end or shank 6 is inserted in and fastened by a handle of any suitable material and shape but preferably of the form shown. The shank 6 of my boner may be made so as to be rigidly secured in a handle such as that shown at 7 or it may be made so as to be secured in a handle such as that disclosed in my pending application Ser. No. 505,020.

My boner is preferably formed of flat steel the lower end of which when viewed edgewise (Fig. 2) has the general conformation of a curved hook.

14 represents the cutting edge of the boner and 15 its blunt edge. The boner blade is tapered from the point 10 near the handle 7 to the extreme end 16 of the blade. The blade 5 is progressively bent backwardly from a point near the point 17 to the end 16 so that the cutting edge 14 of that end is in the rear of that part of the blunt edge 15 of the blade 5 which is near the handle 7 (Fig. 1).

The free end of the blade is curved inwardly at 9 and then slightly outwardly as shown at 16. The hook end portion of the blade 5 of my boner is made flexible by being spring tempered so that it will adapt itself automatically to a bone of varying width when the same is being removed from the meat. Furthermore by making the said hoop portion of a varying curve formation, my boner is made capable of being used to remove bones of various widths.

The cutting edge 14 of my boner extends from a point 10 (Figs. 1 and 2) around the hook 8 to the outward end 16.

In Fig. 4 11 represents a piece of meat to be boned; 12 are clean circular grooves out of which the bones have been removed while 13 is a bone which is shown nearly cut out from the meat 11.

When it is desired to bring the boner into use the handle 7 is grasped in the hand in such a manner as to bring the blade edge 14 toward the operator and the hook 8 is run in the meat and beneath the farthest end of the bone which is to be cut out. The boner is then drawn forwardly through the meat and is held in such a manner as to cause the hook 8 to cleave closely to the bottom of the bone. Thus the bone is cut clean of all the meat. As the boner is brought out near the end of the bone it is tipped slightly to the left and when at the end of said bone it is tipped to the right and at the same time given a slight twisting movement. This causes the hook 8 to cut upwardly through the meat at the end of the bone and thus sever any small flexible bones which may be present near the bone end. In performing the last mentioned operation, the blunt edge of the hook 8 is brought to bear with some pressure against the left hand side of the bone and while giving the boner the final movement the bone is thus caused to be thrown out of place and away from the meat.

From the foregoing it will be evident that my boner will waste less meat than is now wasted in the ordinary boning operations since it follows almost the exact contour of the bone and cuts the meat away close to the same. By using my boner the boning process is much more speedily accomplished than is now possible. The meat after having been boned with my boner has simply smooth circular-bottomed grooves out of which the bones have been cut.

Many other advantages than those hereinbefore enumerated will result from the use of my invention but such advantages will be evident to those skilled in the art and need not be herein pointed out.

Having thus described my invention what I claim is:

1. As an article of manufacture, a rib boner comprising a shank and a blade, said blade having a variable curved hook formation progressively decreasing in width from the beginning to the outer end of said blade and having its cutting edge extending from said shank to the outer end of said hook formation, the part of said cutting edge which extends from the shank to the bottom of said hook formation being at an angle to the back edge of said shank which is opposite to that part of the cutting edge which extends from the bottom of said hook formation to the outer end thereof, whereby a slicing action is produced when the blade is in use.

2. As a new article of manufacture a rib boner comprising a shank and a blade, said blade having a curved hook formation which is progressively bent backward from a point substantially at the lowermost point of its curved hook formation to the end of the blade.

3. As a new article of manufacture a rib boner comprising a shank and a blade, said blade having a curved hook formation, and having its end bent backwardly so that the cutting edge of said end is in the rear of the blunt edge of that part of the blade which is near said shank.

In testimony whereof, I have hereunto set my hand in the presence of two witnesses.

CONRAD M. MAISEL.

Witnesses:
ETHEL A. KELLY,
J. WM. ELLIS.